Oct. 16, 1945.　　　C. A. SAWTELLE　　　2,386,912
FLUID CLUTCH
Filed July 5, 1943　　　3 Sheets-Sheet 1

Inventor
Charles A. Sawtelle
Attorney

Inventor
Charles A. Sawtelle
JS Murray
Attorney

Patented Oct. 16, 1945

2,386,912

UNITED STATES PATENT OFFICE 2,386,912

FLUID CLUTCH

Charles A. Sawtelle, Rosedale Gardens, Mich.

Application July 5, 1943, Serial No. 493,617

8 Claims. (Cl. 192—58)

This invention relates to clutches and particularly fluid clutches.

An object of the invention is to provide a clutch eliminating the usual friction faces and thus avoiding loss of time and material involved by replacement of linings, and eliminating unsatisfactory clutch response due to excessive lining wear.

Another object is to provide a clutch employing a fluid medium to transmit torque and consequently permitting slippage between the driving and driven members, whereby the stresses and shocks incident to load applications are reduced and the clutch may serve to reduce the speed of a driven member below that of the driving member. It is to be noted in this connection that slippage of friction face clutches is objectionable and generally avoided.

Another object is to provide a fluid clutch of such simple construction that its cost will compare favorably with that of a friction face clutch.

Another object is to render a motor vehicle fluid clutch so compact as to permit its installation within the usual flywheel of a vehicle motor.

These and various other objects are attained by the construction hereinafter described and illustrated by the accompanying drawings, wherein.

Figure 1:
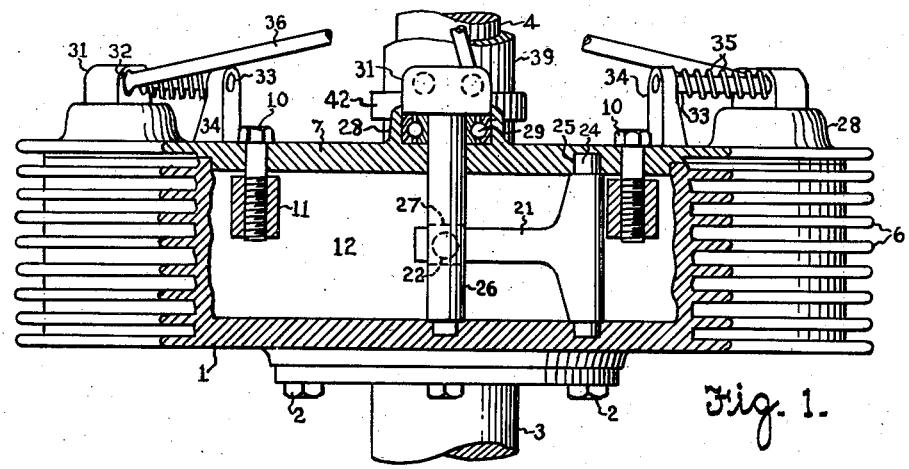
Fig. 1 is a top plan view of the improved clutch, partially in section on the line 1—1 of Fig. 2.

In these views, the reference character 1 designates a flywheel comprising a radial web secured by bolts 2 to one end of a shaft 3 which may be driven by an engine (not shown) or in any other desired manner. Said flywheel serves as a mounting for my improved clutch through which a drive may be established when desired to a shaft 4 aligned with the shaft 3 and having a reduced end portion 5 set into and journaled in the shaft 3. The flywheel rim is exteriorly annularly ribbed, as indicated at 6 to promote heat dissipation, said rim being integrally carried by the web at one side thereof. Rigidly mounted on the flywheel rim at its margin remote from the web is an annular plate 7 extending some distance radially inward from the rim. From the inner margin of the plate 7 an annulus 8 extends within the flywheel toward the web thereof and a plate 9, integral with and inwardly extending from said annulus, is parallel to and spaced from the flywheel web and is centrally apertured to freely accommodate the shaft 4. A plurality of bolts 10, headed against the outer face of the plate 7 are threaded into bosses 11 interiorly formed on the flywheel rim, to mount the member 7, 8, 9 rigidly on said rim.

An annular chamber 12 is formed within the outer portion of the flywheel by the plate 7 and annulus 8 in conjunction with the flywheel rim and web, the inner portion of such chamber being occupied by a fluid-driven clutch ring 13, which mounts a plurality of radially sliding vanes 14 formed preferably of hardened steel. Said vanes, whereof nine are employed in the disclosed construction, are preferably set into guides 15 projecting integrally inward from the ring 13, the inner end portions of each vane being radially slotted to accommodate a pair of coiled springs 16 compressed between the vane and inner portion of the corresponding guide and urging the vane yieldably outward. The radial edges of the vanes have a fluid-sealing contact with the flywheel web and plate 7 and the same is true of annular sealing rings 17 and 18 formed integrally with the ring 13 and interconnecting the guides 15. The ring 18 is not confined to the chamber 12, as is the ring 17, but extends inwardly between the flywheel web and plate 9, and is splined on the shaft 4, serving to transmit a drive from the ring 13 to said shaft.

Surrounding the clutch ring 13 and normally spaced slightly outward therefrom is a flexible band 19, preferably of spring steel, with which the outer edges of the vanes 14 have fluid-sealing contact, the edges of said band having sealing contact with the flywheel web and plate 7. Said band, when not forceably distorted, tends to assume circular form as appears in Fig. 2, being then inwardly spaced from annular shoulders 20 oppositely formed on the flywheel web and plate 7 to limit outward distortion of the band. A drive from the flywheel to said band is permanently established by a plurality of T-shaped arms 21, equidistantly circumferentially spaced, three being employed in the illustrated construction. Said arms are mounted in the outer portion of the chamber 12 in a tangential relation to the band 19, one end of each arm being formed with a boss 22 fitted in an opening 23 of the band and its other end having lateral extensions 24 engaging blind bearing sockets 25 formed respectively in the flywheel web and plate 7 to pivot the arm. Outwardly from its boss 22, each arm is engaged by a rock shaft 26 transversely grooved at 27 to accommodate the arm, and journaled jointly in the flywheel web and plate 7. It is preferred to form the plate 7 with exterior bosses 28 to accommodate the rock shafts and to dispose in each boss a ball bearing 29 and a fluid seal 30. Each rock shaft projects sufficiently beyond the corresponding boss 28 to rigidly carry a head 31 elongated transversely of such shaft to form two blind sockets 32 opening approximately towards the shaft 4, said sockets being oppositely spaced from the rock shaft axis. Entered in one of said sockets of each head 31 is the outer end of an approximately radial pin 33, guided at its inner end by a lug 34 integrally projecting from the plate 7, said pin being yieldably subjected to outward pressure by a spring 35 coiled about said pin and compressed between its headed outer end and said guide lug. The pin has sufficient looseness in said lug to afford it such angular play in the plane of rotation of the clutch as is incident to a required rocking of the head 31. The other socket 32 of each head 31 receives the ball-headed outer end of a toggle push rod 36, the inner ends of the three push rods being individually pivotally connected, as indicated at 37, to a collar 38, the axes of the connections 37 being tangential to the collar. The latter is splined upon a sleeve 39 integrally and centrally projecting from the plate 9, in a free surrounding relation to the shaft 4. A coiled spring 40 compressed between said collar and an abutment 41 on the free end of the sleeve urges the collar toward the flywheel and tends to lodge the collar against an annular exterior rib 42 on the sleeve. In this position of the collar, the push rods 36 have a very slight convergency toward the flywheel, from their outer to their inner ends, as shown in dash lines in Fig. 3. The collar may be actuated to its position shown in full lines in Fig. 3 by a yoke 43 fixed on a rock shaft 44 and engaging a ring 44a in an annular groove 45 in the collar. Such actuation relieves stress on the push rods, by establishing them at a material divergency from the fly-wheel, from their outer to their inner ends. Rocking of the shaft 44 to retract the collar 38 against resistance of the spring 40 may be accomplished in any desired manner, as by the usual clutch pedal (not shown) of a motor vehicle.

It is to be understood that the annular space between the clutch ring 13 and band 19 is filled with oil or some other suitable liquid and a normally plugged fill opening 46 may be provided for renewal of such liquid if and when required.

Figure 3:
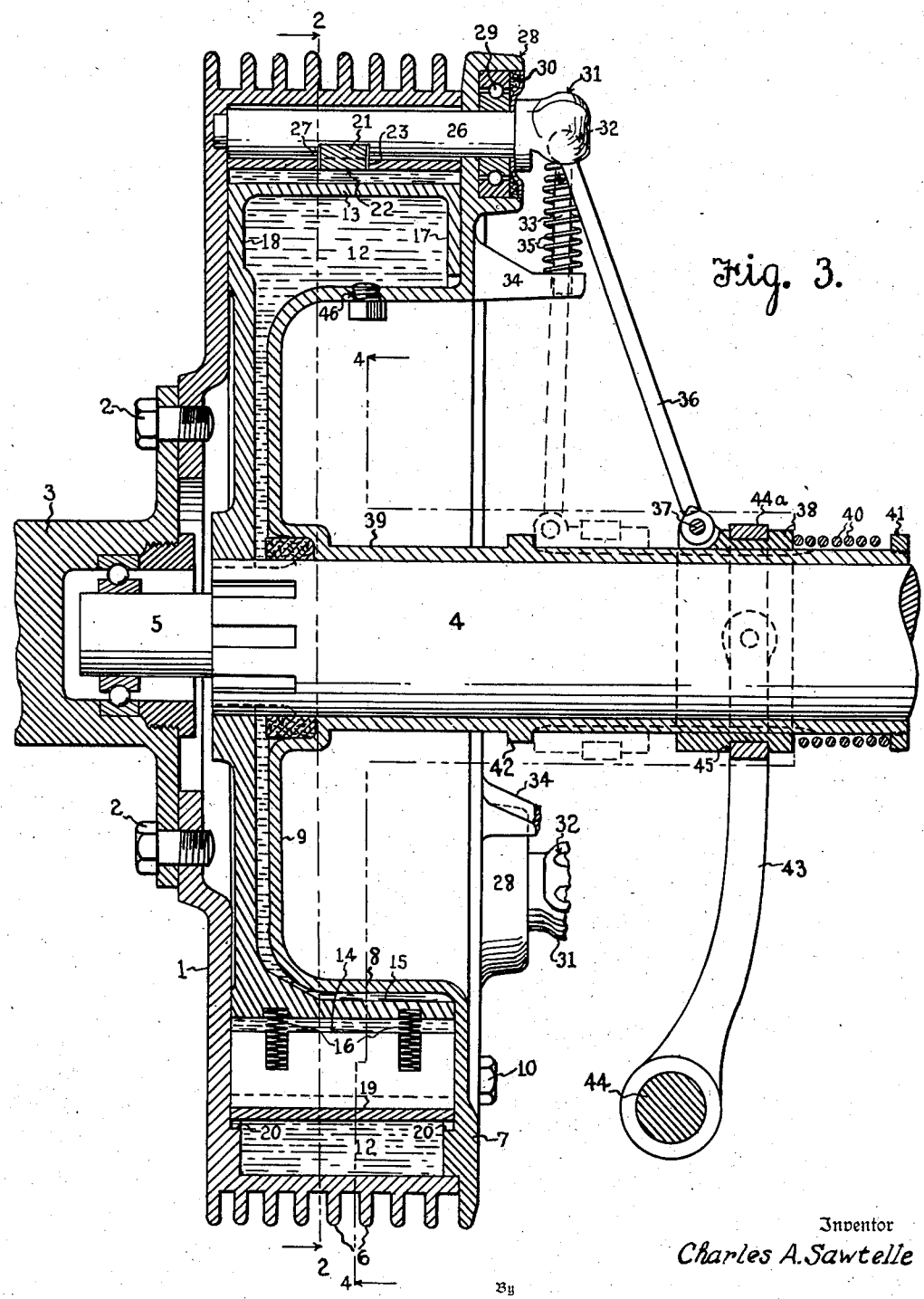
Fig. 3 is a diametrical sectional view of the clutch taken on the line 3—3 of Fig. 2.
Figure 4:
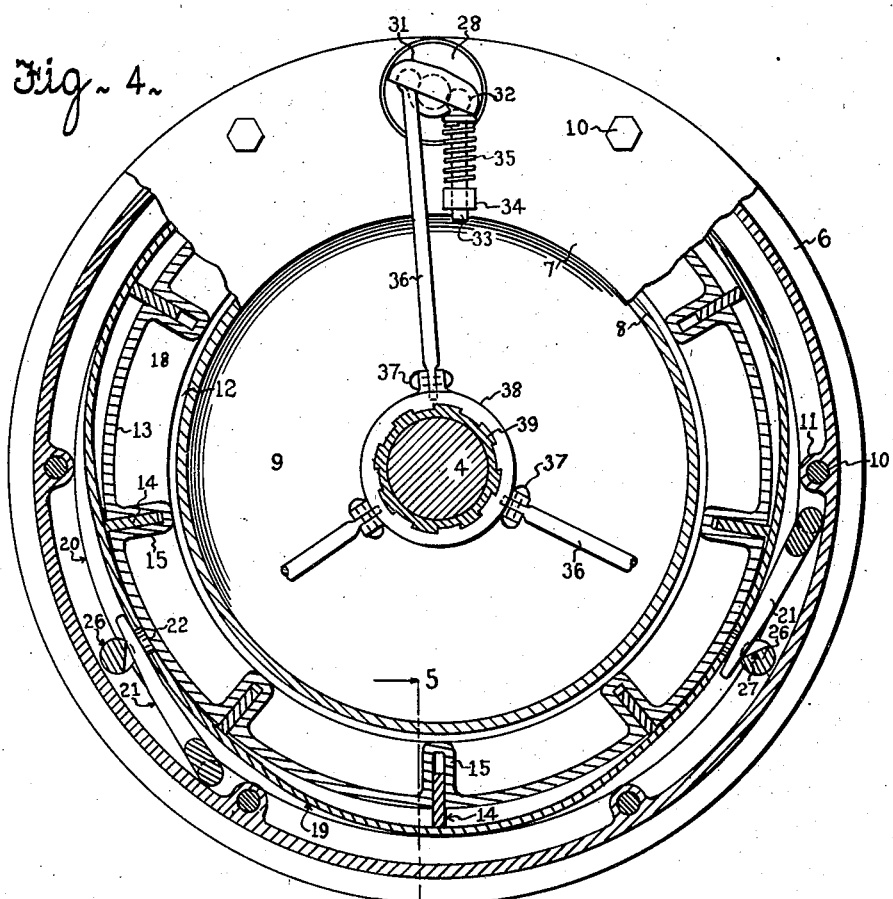
Fig. 4 is an end elevational view, partially in section on line 4—4 of Fig. 3 and showing the clutch applied.
Figure 5:
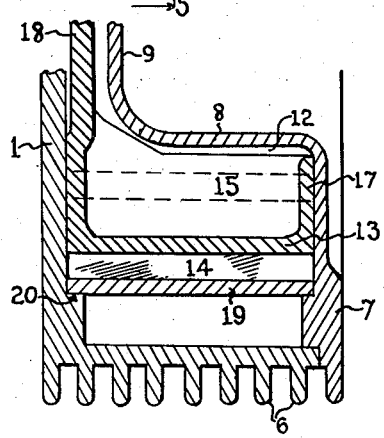
Fig. 5 is a radial section taken on the line 5—5 of Fig. 4.

In use of the described clutch, the spring 40 normally holds the collar 38 against the abutment 42, thus maintaining the push rods 36 substantially transverse to the clutch axis, as per dash line showing in Fig. 3. Hence the ends of the heads 31 engaged by the push rods are normally outwardly rocked while the pins 33 are thrust toward the clutch axis, compressing the springs 35. In their resulting position, the rock shafts 26 bear on the arms 21, as shown in Fig. 4, at terminal edges of the grooves 27 acting through said arms to apply an inward pressure to the flexible band 19 whereby the latter is held firmly against the ring 13. This inward distortion of the band from its inherent circular form at equidistant points induces an expansion of the band between such points, as clearly appears in Fig. 4. The vanes 14 slidingly adjust themselves differentially to the band, while maintaining constant fluid-sealing engagement with it. The bulging of the band between the three points of its inward distortion may also be regarded as due to a redistribution of the liquid confined between the band and clutch ring 13.

With the parts positioned as described, it is evident that the band 19, as driven by the flywheel through arms 21 has portions traveling the circumferential path occupied by the liquid and that the liquid cannot be displaced by said portions, being confined in the chambers formed between the vanes and between the band and clutch ring 13. Hence the liquid is compelled to transmit rotation from the band to said vanes, the latter driving the clutch ring which in turn drives the shaft 4.

Figure 2:
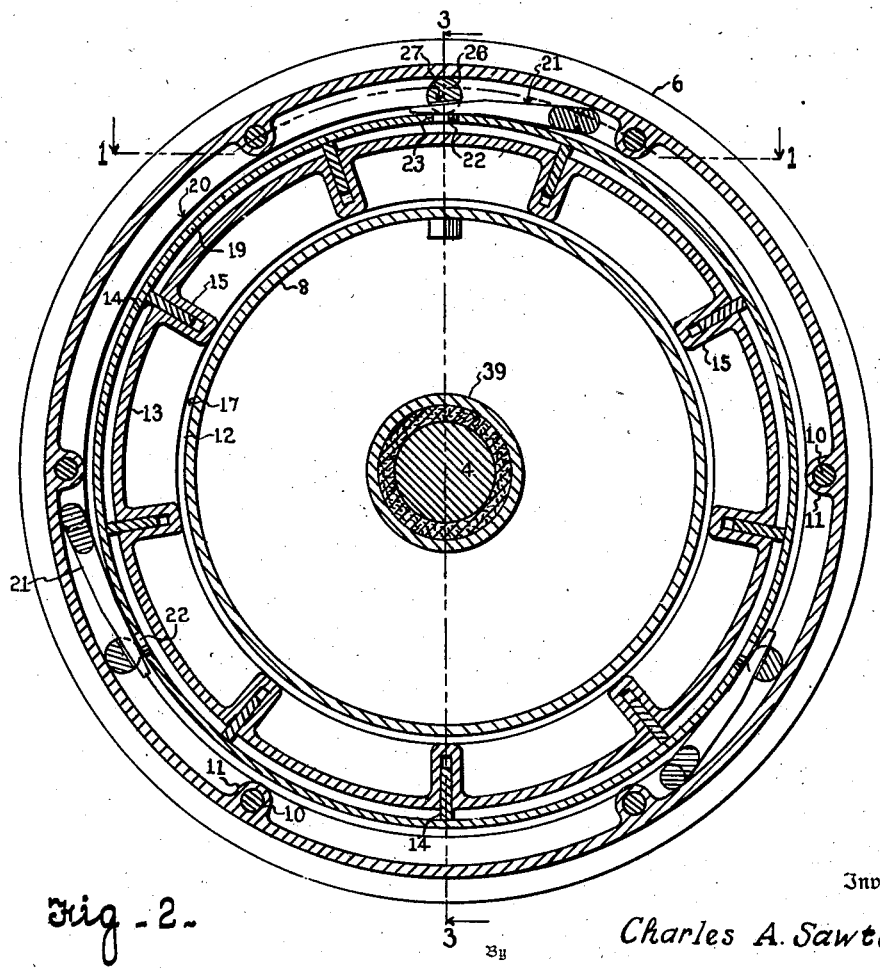
Fig. 2 is a cross sectional view, taken on the line 2—2 of Fig. 3, and showing the clutch released.

When the collar 38 occupies its clutch-releasing position, as per full line showing in Fig. 3, the push rods 36 are relieved of material thrust and the springs 35 acting through the heads 31 on the rock shafts 26, establish the latter in the positions shown in Fig. 2, relieving pressure on the arms 21 and hence on the band 19. Upon relief of such pressure the band resiliently returns to its inherently circular form, continuing to confine the liquid but ceasing to apply any material torque to the latter.

The clutch, as shown in Fig. 4 and in dash lines in Fig. 3, establishes a full drive as will commonly be desired. Numerous conditions will arise, however, rendering a partial drive temporarily advantageous. For example, a car equipped with the described clutch may be required to climb a short hill involving such an increase of motor load as would ordinarily entail shifting into second gear. Such necessity may be avoided by partially releasing the clutch so that slippage thereof results in a speed reduction of the transmitted drive. With the clutch partially applied, a distortion of the band is effected but not a maximum distortion such as brings the band into contact with the ring 13. Thus a regulated portion of the liquid will travel reversely to the direction of clutch rotation and reduce torque transmission to any desired extent. By reducing the frequency of shifting gears, the improved clutch will materially reduce wear on the gears, giving the latter a greater life and rendering driving less arduous.

In engaging the described clutch under all conditions, a greater smoothness of driving is available, since necessity is eliminated for an abrupt application of full load as in present practice and the increase of torque transmission may be so distributed over a suitable time interval as to avoid any jerking or sudden stress on a motor vehicle with resultant discomfort to the occupants.

Moreover, the described clutch will greatly facilitate starting a vehicle on an icy or other slippery surface or in picking up any abnormally heavy load, since the application of torque to the driven wheels may be accomplished so gradually as to minimize their tendency to spin.

It will be noted that the grooved faces of the rock shafts 26 have a camming action in applying pressure to the arms 21, the angle between said grooved faces and the arms never being great enough to effect locking of the arms. Thus upon release of the clutch, the expansive tendency of the band supplements the springs 35 in effecting such rotation of the rock shafts as permits the band to assume circular form.

It is further to be noted that when the rock shafts are in their clutch-applying position, they are locked in that position by the push rods 36 since the latter are then substantially transverse to the clutch axis and cannot yield responsive to any fluid-induced effort of the band to overcome distortion applied by the rockshafts. Since the inclination of the push rods is to a slight extent reversed when the collar 38 assumes its clutch-applying position, any stresses reacting through the push rods upon the collar tend merely to seat it more firmly against the abutment 42.

What I claim is:

1. A fluid clutch comprising coaxial rotary driving and driven members, an annulus confined between said members in a substantially coaxial relation therewith, and forming with one of said members a fluid chamber, and flexible to and from the last-mentioned member, a liquid confined in said fluid chamber, a plurality of blades mounted in circumferentially spaced relation upon the last-mentioned member and slidable through said fluid chamber to and from said annulus, means permanently and positively connecting said annulus to the other of said members for rotation therewith, means yieldably acting on the blades and maintaining fluid-sealing contact thereof with the annulus, and means for imposing and relieving pressure upon circumferentially spaced portions of said annulus to flex such portions into or out of engagement with the blade-mounting member, and thereby afford a transmission of torque through said liquid.

2. A fluid clutch as set forth in claim 1, said means for imposing and relieving pressure on the annulus taking effect through said means connecting the annulus to the other of said members for rotation therewith.

3. A fluid clutch as set forth in claim 1, the annulus being apertured for engagement by said means connecting the annulus to the other of said members for rotation therewith.

4. A fluid clutch comprising coaxial rotary driving and driven members, the driving member being chambered to receive the driven member, an annular band substantially coaxial with and disposed between said members and flexible to and from the clutch axis, a set of blades circumferentially spaced and slidable substantially radially on one of said members and having edges in fluid-sealing engagement with said band, means permanently and positively connecting the band to the other of said members to rotate in unison with such other member, springs effective on said blades to maintain their engagement with the band, a liquid for transmitting a drive from the driving to the driven member, occupying a substantially annular space between said band and the member wherein the blades are slidable, such space being subdivided by the blades, and means for radially flexing the band at least at one point around its circumference into engagement with the blade-mounting member whereby the band coacts with certain of the blades to trap portions of said liquid, and the liquid so trapped transmits a drive from the driving to the driven member.

5. A fluid clutch as set forth in claim 4, said means connecting the band to the other of said members comprising arms disposed substantially in a tangential relation to the band and pivoted at corresponding ends thereof to rock as the band is flexed and thus adapt themselves to such flexure.

6. A fluid clutch comprising an outer rotary driving member, an inner rotary driven member, an annular body of liquid engaging one of said members, a flexible annulus coacting with the last-mentioned member to confine said liquid body, such annulus being normally circular, a permanent and positive drive connection from the driving member to said annulus, radially slidable torque transmission elements carried by the driven member and extending through said liquid body into sealing engagement with said annulus, and means for flexing said annulus at circumferentially spaced points thereof toward the driven member to establish a drive from the annulus through the liquid to said elements.

7. A fluid clutch comprising coaxial rotary driving and driven members, a radially flexible annulus confined between said members in a substantially coaxial relation therewith and forming with one of said members a fluid chamber, a liquid confined in said fluid chamber, a plurality of blades mounted in circumferentially spaced relation upon the last-mentioned member and slidable through said fluid chamber to and from the annulus, a plurality of arms spaced circumferentially of the clutch and extending tangentially with respect to said annulus and establishing drive connections to the annulus from the other of said members, means adapting said arms to rock to and from the axis of the clutch, a rotary cam effective on each of said arms to distort the annulus into engagement with the blade-mounting member, and means for concurrently rocking said cams.

8. A fluid clutch comprising coaxial rotary driving and driven members, a radially flexible annulus confined between said members in a substantially coaxial relation therewith and forming with one of said members a fluid chamber, a liquid confined in said fluid chamber, a plurality of blades mounted in circumferentially spaced relation upon the last-mentioned member and slidable through said fluid chamber to and from the annulus, a plurality of rock shafts spaced circumferentially of the clutch and lying substantially parallel to the clutch axis, cams on said rock shafts effective on the annulus to flex it from a normally substantially circular idling position to a distorted drive-transmitting position of engagement with the blade-mounting member, a head on each rock shaft extending in opposite directions from such shaft, a plurality of push rods radiating from the clutch axis and engaging said heads at corresponding sides of the rock shafts for rotating the cams to their annulus-flexing position, springs effective on said heads at the other sides of the rock shafts opposing the rotation applied by said rods, and means for shifting the inner ends of the rods in unison along the clutch axis to control the effect of said rods on the rock shafts.

CHARLES A. SAWTELLE.